Figure 1:
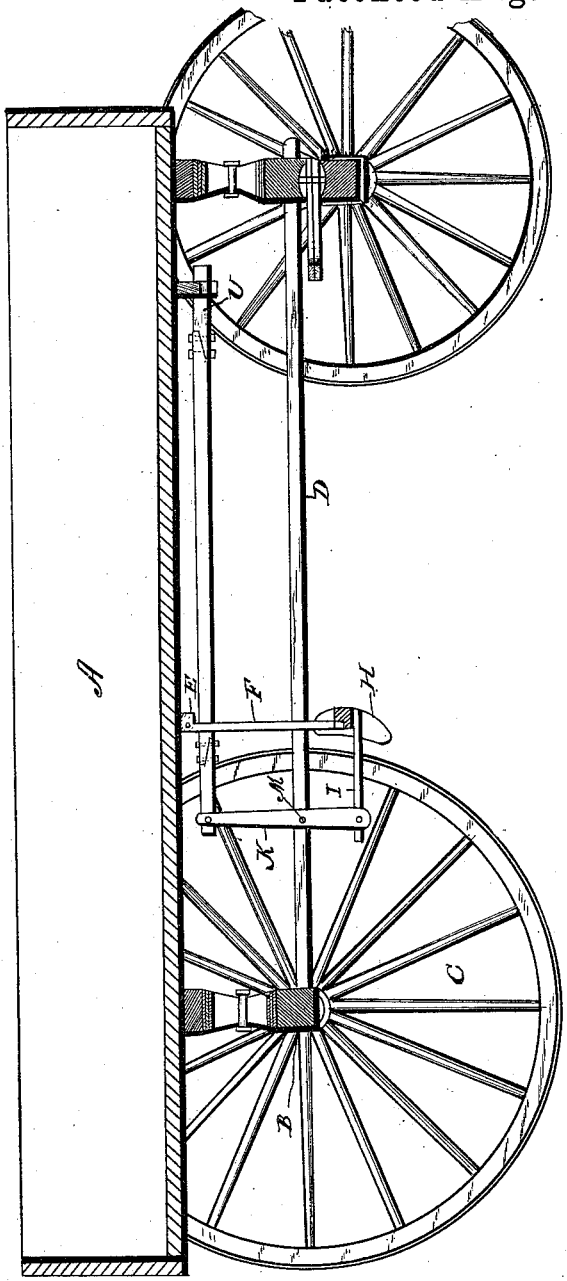

(No Model.) 2 Sheets—Sheet 1.

J. C. MORTON.
VEHICLE BRAKE.

No. 408,736. Patented Aug. 13, 1889.

Witnesses
J. M. Fowler Jr.
Edwin Turner

Inventor
Joseph C Morton
Attorneys
J. W. Flenner & Co

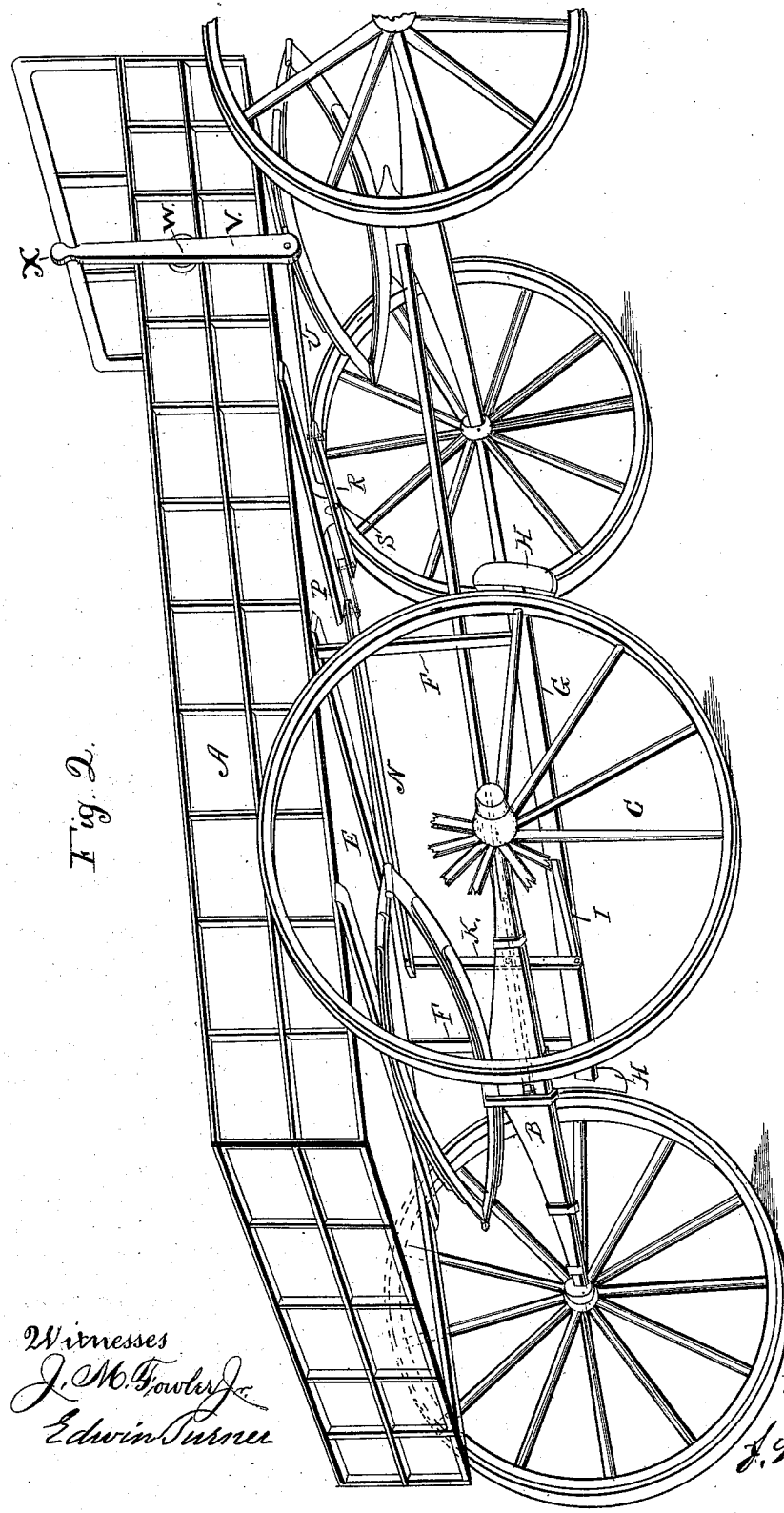

UNITED STATES PATENT OFFICE.

JOSEPH C. MORTON, OF HAMILTON, MISSOURI.

VEHICLE-BRAKE.

SPECIFICATION forming part of Letters Patent No. 408,736, dated August 13, 1889.

Application filed March 13, 1889. Serial No. 303,186. (No model.)

*To all whom it may concern:*

Be it known that I, JOSEPH C. MORTON, a citizen of the United States, residing at Hamilton, in the county of Caldwell and State of Missouri, have invented certain new and useful Improvements in Vehicle-Brakes; and I do hereby declare the following to be a full, clear, and exact description of the invention, such as will enable others skilled in the art to which it appertains to make and use the same.

My invention relates to certain improvements in brakes for vehicles; and it has for its objects to provide an improved construction of parts, whereby the brakes are supported and operated to be released from the wheels, as will be hereinafter described, and particularly pointed out in the claim.

The above-mentioned objects I attain by the means illustrated in the accompanying drawings, in which—

Figure 1 illustrates a longitudinal vertical sectional view of my improved brake applied to a vehicle; and Fig. 2, a perspective view of a vehicle, showing the brake-operating mechanism.

Referring to the drawings, the letter A indicates the body of a vehicle; B, the axles thereof; C, the rear wheels mounted on the rear axle, and D the longitudinal reach connecting the forward and rear axles.

Directly in front of the rear axle, and secured to the bottom of the vehicle-body, is a transverse bar E, which is parallel with the rear axle. From the said bar E is suspended, by means of the spring-hangers F, a transverse bar G, which is provided at its ends with the brake blocks or shoes H, made of any suitable material, which are adapted to bear against the peripheries of the rear wheels of the vehicle. The spring-hangers F give to the movement of the brake-operating bars and levers, so as to permit the shoes to be forced against the peripheries of the rear wheels of the vehicle, and when released restore the shoes to their normal position. To the central portion of the said brake-bar is attached one end of a link I, the other end of which is connected to the lower end of a lever K, which is fulcrumed to the reach D at the point M, and from the upper end of the lever K extends a bar N, pivoted to said lever at its rear end, the forward end of said bar being pivoted to the end P of a lever R, which is fulcrumed to the body of the vehicle or truck thereof at the point S. To the opposite end of said lever is pivoted the rear end of a link U, the forward end of which is pivoted to a lever V, fulcrumed to one side of the vehicle-body, as shown at W, and provided with a foot-rest X at its upper end.

The operation of my improved brake will be apparent in connection with the above description, and is as follows: Upon pressing the upper end of the foot-lever forward the lever R, through the medium of the bar N, will operate the lever K so as to draw the brake-bar E toward the rear wheels of the vehicle, so as to apply the brake-shoes to the peripheries thereof with any desired amount of force. Upon releasing the foot-lever the other levers are operated automatically by the spring action of the hangers F to release the brakes from the wheels and restore the brake-operating mechanism to its normal position.

Having now fully described my invention and the operation thereof, what I claim, and desire to secure by Letters Patent, is—

The combination, with the rear wheels of a vehicle, of the transverse brake-bar carrying the brake-shoes, the spring-hangers supporting said brake-bar, and the operating-levers and connections whereby the brake-bar is operated to apply the brakes, substantially as and for the purpose specified.

In testimony whereof I affix my signature in presence of two witnesses.

JOSEPH C. MORTON.

Witnesses:
C. H. HUSTIN,
JAMES McADOO.